(12) United States Patent
Walsh

(10) Patent No.: US 10,760,643 B2
(45) Date of Patent: Sep. 1, 2020

(54) PASSIVE VARIABLE NEGATIVE STIFFNESS DEVICE AND METHODS OF USE THEREOF

(71) Applicant: OHIO UNIVERSITY, Athens, OH (US)

(72) Inventor: Kenneth K. Walsh, Athens, OH (US)

(73) Assignee: Ohio University, Athens, OH (US)

( * ) Notice: Subject to any disclaimer, the term of this patent is extended or adjusted under 35 U.S.C. 154(b) by 99 days.

(21) Appl. No.: 16/154,037

(22) Filed: Oct. 8, 2018

(65) Prior Publication Data

US 2019/0040931 A1 Feb. 7, 2019

Related U.S. Application Data

(63) Continuation of application No. PCT/US2017/026825, filed on Apr. 10, 2017.

(60) Provisional application No. 62/320,088, filed on Apr. 8, 2016.

(51) Int. Cl.
 *F16F 15/06* (2006.01)
(52) U.S. Cl.
 CPC ........ *F16F 15/06* (2013.01); *F16F 2228/063* (2013.01); *F16F 2228/08* (2013.01)
(58) Field of Classification Search
 CPC .. F16F 15/06; F16F 2228/08; F16F 2228/063; F16F 13/00
 See application file for complete search history.

(56) References Cited

U.S. PATENT DOCUMENTS

| 4,778,037 | A | 10/1988 | Papadopoulos |
| 9,206,616 | B2 | 12/2015 | Sarlis et al. |
| 9,752,643 | B2 * | 9/2017 | Zhu ............. F16F 15/067 |
| 2010/0053589 | A1 | 3/2010 | Hashemi et al. |
| 2013/0118098 | A1 | 5/2013 | Constantinou et al. |
| 2015/0165852 | A1 | 6/2015 | Suissa |

OTHER PUBLICATIONS

Attary, N. et al., Performance Evaluation of Negative Stiffness Devices for Seismic Response Control of Bridge Structures via Experimental Shake Table Tests, Journal of Earthquake Engineering, Aug. 21, 2014, pp. 249-276, 19.

Attary, N. et al., Development of a Rotation-Based Negative Stiffness Device for Seismic Protection of Structures, Journal of Vibration and Control, Apr. 11, 2015, pp. 1-15.

(Continued)

*Primary Examiner* — Xuan Lan Nguyen
(74) *Attorney, Agent, or Firm* — Standley Law Group LLP; Eric M. Gayan; Jeffrey S. Standley

(57) ABSTRACT

A passive variable negative stiffness device (passive VNSD) configured to facilitate a transition to zero stiffness by using elastic devices (e.g., springs) combined with translating and rotating components. An exemplary embodiment of a passive VNSD may comprise at least one pretensioned and/or precompressed elastic device to produce the desired force-displacement profiles. For instance, an exemplary embodiment of a passive VNSD may be adapted to produce force-displacement profiles that transition from zero stiffness, to negative stiffness, and then to positive stiffness (ZNP) and from zero stiffness, to negative stiffness, and then back to zero stiffness (ZNZ).

20 Claims, 6 Drawing Sheets

(56) References Cited

OTHER PUBLICATIONS

Pasala, D.T.R. et al., Apparent Weakening in SDOF Yielding Structures Using a Negative Stiffness Device: Experimental and Analytical Study, Journal of Structural Engineering, Jul. 16, 2014.
Boso, E., Variable Passive Negative Stiffness Device for Seismic Protection via Apparent Weakening, Dec. 2016.
Nagarajaiah, S. et al., Adaptive Negative Stiffness: A New Structural Modification Approach for Seismic Protection, 5th World Conference on Structural Control and Monitoring, Jul. 12-14, 2010.
Pasala, D.T.R., Adaptive Negative Stiffness: New Structural Modification Approach for Seismic Protection, Journal of Structural Engineering, Jul. 2013, pp. 1112-1123.
Attary, N. et al., Experimental Shake Table Testing of an Adaptive Passive Negative Stiffness Device within a Highway Bridge Model, Earthquake Spectra, Nov. 2015, pp. 2163-2194, vol. 31, No. 4.
Kwon, I. et al., Implementable Bio-Inspired Passive Negative Spring Actuator for Full-Scale Structural Control under Seismic Excitation, Journal of Structural Engineering, 2016.

* cited by examiner

PASSIVE VARIABLE NEGATIVE STIFFNESS DEVICE AND METHODS OF USE THEREOF

This application is a continuation of PCT Application No. PCT/US2017/026825, filed Apr. 10, 2017, which claimed the benefit of U.S. Provisional Application No. 62/320,088, filed Apr. 8, 2016, which is hereby incorporated by reference in its entirety.

BACKGROUND AND SUMMARY OF THE INVENTION

Exemplary embodiments described herein relate generally to passive variable negative stiffness devices that may be used, for example, to mitigate the effects of seismic events on structures, such as civil structures, or other types of vibration or other movement (e.g., equipment).

The effects of seismic events—especially large earthquakes—can be devastating to urban areas, and often include the collapse of structures, disruption of transportation infrastructure, and the interruption of business. These effects can lead to large economic losses and even the loss of life. In the United States, several major earthquakes have occurred in California within the last fifty years, such as the 1971 San Fernando earthquake, the 1989 Loma Prieta earthquake, and the 1994 Northridge earthquake. Each of these events resulted in the collapse of large buildings or major highways, with deaths numbering less than a hundred per event (National Research Council, 2011). However, the magnitude (<7) of each of these earthquakes, and the size of the area that was impacted, was comparatively small.

In contrast, a report published in 2008 by the United States Geological Survey estimated that a magnitude 7.8 earthquake occurring on the southernmost 200 miles of the San Andreas Fault would result in 1,800 deaths and $213 billion in economic losses (building damages, non-structural damages, damage to lifelines and infrastructure, and fire losses). Furthermore, this hypothetical event does not even represent the largest earthquake that can be produced by the San Andreas Fault at the selected location.

The inelastic response of building structures combined with supplemental viscous damping has motivated research into apparent weakening for seismic response control. The term apparent weakening refers to the softening of the structure apparent stiffness through the addition of negative stiffness at a displacement that is smaller than the structure yield displacement. The resulting structure with combined positive and negative stiffness emulates yielding, thereby limiting the base shear forces and absolute accelerations. Viscous damping is also added to the structure to limit the increase in displacements that occur due to softening. The structure benefits from the yielding behavior, without incurring the damage associated with actual yielding, for structure displacements smaller than the yield displacement. While the benefits of apparent weakening may be realized through the addition of negative stiffness, it requires a passive adaptive negative stiffness device (NSD), which is not easily achieved.

In order to emulate yielding at a structure displacement that is smaller than the actual yield displacement ($u_y$), negative stiffness should be added to the structure when it reaches a predetermined apparent yield displacement ($u_y'$). This is represented by the dark grey line extending down from the x-axis on the plots shown in FIG. 1. If the negative stiffness added to the structure is equal to the structure positive stiffness (light grey line), then the combined structure-NSD stiffness will be zero (black line). Once the structure displacement reaches $u_y$, yielding will occur and there will be a reduction in the structure stiffness. If the negative stiffness added to the structure remains unchanged beyond $u_y$, the combined structure-NSD stiffness will become negative, and the structure will become unstable. Therefore, after $u_y$ has been reached, the negative stiffness should be removed.

Negative stiffness can be removed by transitioning to positive or zero stiffness. Transitioning to positive stiffness will result in a stiffening of the combined structure-NSD system as the positive stiffness from the NSD is added to the inelastic stiffness of the structure, leading to an increase in the combined stiffness beyond that of the inelastic stiffness of the structure (see FIG. 1 (a)). Transitioning to zero stiffness also leads to an increase in the stiffness of the structure-NSD system as the negative stiffness is removed and the inelastic stiffness of the structure remains (see FIG. 1(b)). However, the resulting combined structure-NSD stiffness will be less than that which occurs with the transition to positive stiffness. The transition to zero stiffness results in structure-NSD behavior that more closely emulates a yielding structure, and has been described as an ideal case that is difficult to achieve with a passive device.

Past research in apparent weakening has been based on a negative stiffness device that transitions to positive stiffness, rather than zero stiffness, after structure yielding. In particular, an adaptive negative stiffness system (ANSS) has been studied extensively through numerical and experimental investigation. The force-displacement profile of the ANSS is best represented by that shown in FIG. 1(a). Analytical modeling of the NSD component of the ANSS has been performed, and the effect of large rotations and inertia on the NSD force has been examined. An analytical model has been used to simulate the behavior of an equivalent SDOF building structure with NSD, and with and without dampers, subject to both periodic and random ground motions. It was found that for structures that remain in the elastic range, the base shear of the structure is reduced substantially and passive damping can be used to limit displacements. For yielding structures, it was found that the appropriate combination of NSD and a passive damper can significantly reduce displacements, accelerations, and base shear compared to the base structure. In laboratory studies on a fixed-base building without yielding, it was found that adding the NSD with no viscous dampers reduced the base shear by more than 30%, and the peak acceleration by more than 20%, compared to the structure with no NSD for the strong earthquakes considered. For the same building with mild yielding, the base shear and accelerations of the structure-NSD system were reduced by more than 30%. However, for severe ground motions, the system is subject to large displacements during which stiffening occurs. The stiffening results in an increase in the base shear and acceleration. The addition of the viscous damper to the structure-NSD results in consistent reductions in displacements, acceleration, and base shear by more than 20%.

In addition to the fixed-base building research, the performance of the ANSS has also been investigated for a seismically-isolated building. It was found that adding the NSD to the isolation system resulted in a reduction in the base shear force (force transmitted to the foundation), interstory drift of the superstructure, and floor accelerations, and had little to no effect on the isolator base displacements. However, it was shown that the addition of viscous dampers to the isolation system with NSD resulted in a substantial reduction in base displacements. Additional shake table studies were performed to study the effectiveness of the ANSS for seismic isolation of a highway bridge model. The results showed that the inclusion of the NSDs can significantly reduce the shear forces in the substructure, thereby protecting the bridge piers and abutments from strong earthquakes. One of the favorable outcomes of the research was the effectiveness of the NSDs even when a flexible layer (i.e., bridge piers) is inserted between them and the foundation of the structure. Also of note was that the system achieved a non-resonant condition due to the constantly changing stiffness once the NSD is engaged. Numerical simulations on the same bridge model showed that the ANSS will not be effective for all ground motions, but that flexibility within the design parameters of the NSD may allow it to be modified to be effective for site-specific ground motions.

Another adaptive passive NSD that has been proposed for seismic protection is the rotation-based mechanical adaptive passive stiffness (RBMAP-S) device. It consists of a primary gear and two secondary gears mounted in series, but not initially in contact. The secondary gears are pre-torqued and held in place using a pawl. Rotation of the primary gear is initiated by displacement of the structure through a connecting arm. The system was designed so that the primary gear engages one of the two secondary gears after a predetermined structure displacement. Once engaged, the secondary gear disengages from the pawl and transfers the stored torque to the primary gear, which in turn transfers a force to the structure that assists its motion. Small-scale experiments and analytical equations both showed a sudden increase in the force exerted on the structure once the secondary gear engaged due to the sudden increase in torque on the primary gear. A modified version of the device including an additional precompressed spring, torsional spring, and slotted connections was proposed to obtain the desired force-displacement profile, which is best represented by FIG. 1(a).

A third adaptive passive NSD that has been recently proposed for seismic protection is the bio-inspired passive negative spring actuator (BIPNSA), which utilizes a preloaded spring attached between the first story of a structure and a roller bearing supported by a ramp on the ground floor. Lateral displacement of the upper story causes the roller bearing to move down the ramp and exert a horizontal force that assists the structure motion. Experimental validation of the concept was performed, and the same configuration was shown to be effective in small-scale shake table experiments at reducing the first floor displacement and third floor acceleration of a seismically-excited building model.

In sum, a review of the state-of-the-art in adaptive passive negative stiffness devices revealed only three that may be capable of producing the force-displacement profiles required for apparent weakening. Of these, the ANSS system was studied extensively through numerical methods and large-scale laboratory experiments. From those studies, it was revealed that the flexibility and inertia of the ANSS assembly influenced the negative stiffness of the system, and should therefore be minimized. It was also reported that improperly designed gap spring assemblies (GSAs) can lead to an undesirable force-displacement behavior of the assembly. Other issues with respect to the efficiency and reliability of the ANSS may also be related to the GSAs. The GSA forces are added to the NSD at all structure displacements, even after $u_y'$ has been reached. As a result, the force from the precompressed vertical spring must be excessively large so that the net force produced by the NSD matches the desired force-displacement profile. Another potential issue with the GSAs is damage during an earthquake, which could occur through impact as the GSAs are continuously engaged and disengaged during operation. Damage to the GSAs would result in an unwanted increase in the negative stiffness provided to the structure, resulting in a potentially unstable condition.

Exemplary embodiments of the present invention may address some or all of the shortcomings of the known art. In particular, exemplary embodiments of the present invention may facilitate a transition to zero stiffness by using elastic devices (e.g., springs) combined with translating and rotating components. Some exemplary embodiments may allow, for example, spring sizes to be minimized. An example of the efficient design may increase the ability to realize the system in a variety of environments. Some exemplary embodiments may also allow for forces to be applied to, for example, a subject structure substantially continuously, which significantly improves the ability to account for movement in the subject structure while minimizing impact forces on the structure. For instance, some exemplary embodiments may be particularly useful in association with building and bridge structures, such as to address movement caused by seismic activity, wind, etc. or any other type of movement. Exemplary embodiments may also be used in association with other types of systems, structures, devices, etc., such as equipment that has a tendency to vibrate or experience other undesired movement during operation or for other types of movement isolation applications.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figures 1A, 1B:
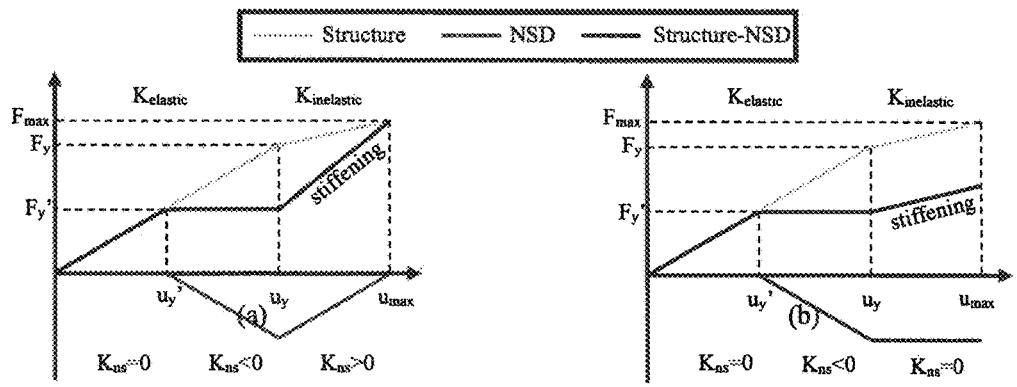
FIG. 1(a) is a graph showing an example of apparent weakening for NSD with positive stiffness after structure yielding.
FIG. 1(b) is a graph showing an example of apparent weakening for NSD with zero stiffness after structure yielding.

Exemplary embodiments of the present invention are directed to variable negative stiffness devices (VNSD) that, for example, may be used as an effective alternative to the state-of-the-art in adaptive passive negative stiffness devices. An example of a VNSD may be a simple, compact, efficient, reliable, and/or relatively inexpensive device that is capable of transitioning to zero stiffness at large displacements (see, e.g., FIG. 1(b)). Another example of a compact VNSD may reduce the effect of flexibility and inertia on the negative stiffness, and may also facilitate its installation, for example, in building and bridge structures. For yet another example, one embodiment of a VNSD, such as when combined with an elastic element with positive stiffness equal to the VNSD negative stiffness, may be employed in a vibration isolation system which would exhibit zero stiffness when the negative stiffness of the VNSD is engaged. Other benefits are also possible. For instance, an example of an efficient embodiment may allow for the sizes of the elastic devices, e.g., springs, to be minimized, which may make such a system more realizable for implementation in a variety of applications. An exemplary embodiment may also minimize impact by using components that are always (or substantially always) engaged and provide a continuous (or substantially continuous) force to a structure, system, device, etc. Furthermore, an exemplary embodiment may be relatively simple and inexpensive such as due to the use of a combination of basic machine components.

In light of the aforementioned characteristics, an exemplary embodiment of a VNSD may be used in a variety of applications, not limited to building or bridge applications. Some other examples of general vibration isolation applications are vehicle suspensions, vehicle seat suspensions, and sensitive equipment. In view of the disclosure herein, it will be apparent that many other uses are possible to address undesirable vibration or other movement of a structure, system, device, etc.

Figure 2:
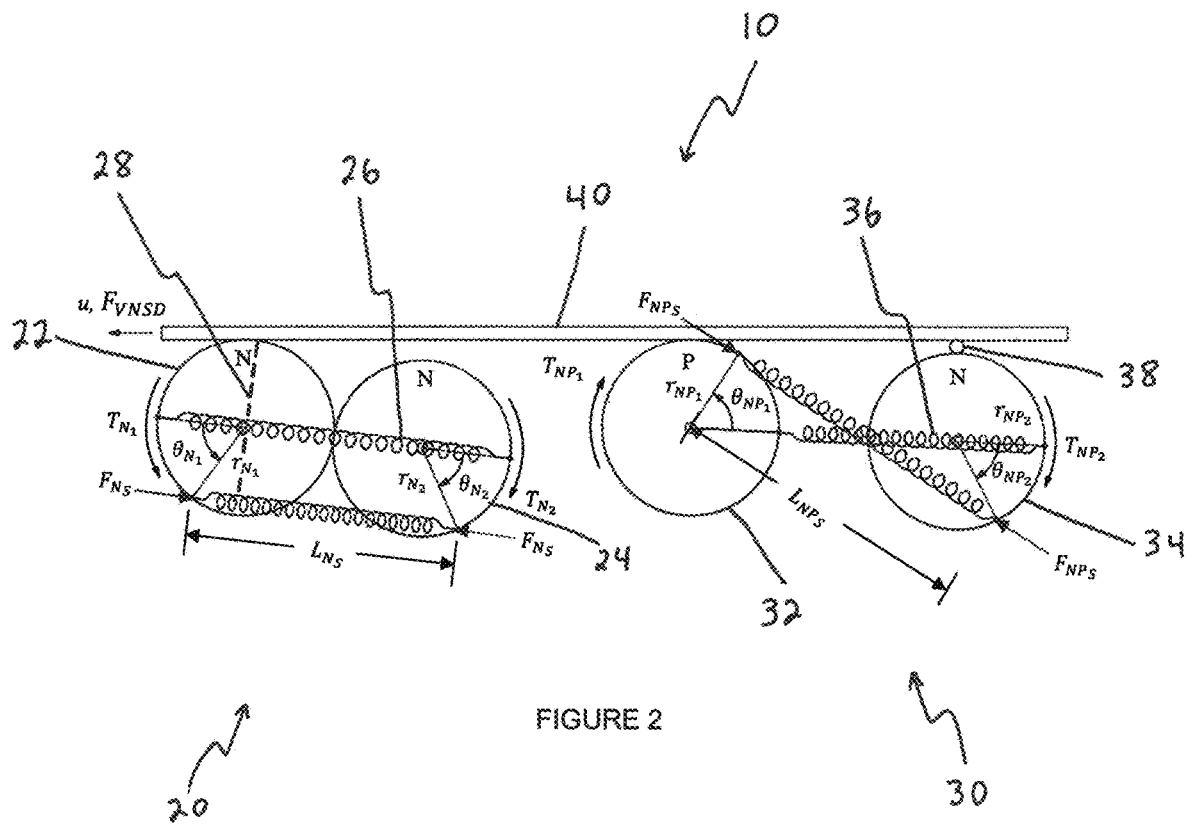
FIG. 2 is a schematic of a first exemplary embodiment of a passive variable negative stiffness device (passive VNSD).

A first exemplary embodiment of a VNSD (i.e., Configuration 1 or system 10) is shown in FIG. 2. Configuration 1 is comprised of a first disc pair 20 and a second disc pair 30, each of which is associated with a translating component 40. In operation, translation of component 40 is adapted to cause rotation of the discs, which in turn exert forces on component 40. Specifically, first disc pair 20 is adapted to create forces that are transferred to component 40 to induce a negative stiffness and is therefore identified as an N-N disc pair in FIG. 2. On the other hand, second disc pair 30 is adapted to create forces that are transferred to component 40 to induce a combination of negative stiffness and positive stiffness and is therefore identified as an N-P disc pair in FIG. 2. More particularly, as will be explained in more detail below, this combination of disc pairs may be adapted to effectively produce the force-displacement profiles that are shown FIGS. 1(a) and 1(b).

In particular, first disc pair 20 is comprised of a disc 22 that is engaged or otherwise associated with disc 24. In this embodiment, first disc pair 20 also includes a pretensioned elastic device 26 that is respectively connected on the outer half (more preferably at or near the outermost circumference) of each disc (relative to the other disc, as determined when the discs are in a stationary state; an imaginary dashed line 28 is shown for purposes of example on disc 22 to indicate an outer half and an inner half) such that the elastic device 26 extends between disc 22 and disc 24. Disc 22 is engaged or otherwise associated with component 40, whereas disc 24 is separated from and not directly engaged with component 40. Translation of component 40 therefore induces rotation of disc 22, which in turn causes counter-rotation of disc 24. The resulting forces exerted on component 40 then induce negative stiffness.

Second disc pair 30 is comprised of a disc 32 that is associated with disc 34. However, in this instance, disc 32 is separated from and not directly engaged with disc 34. In this pairing, a pretensioned elastic device 36 is connected on the inner half (more preferably at or near the innermost circumference) of disc 32 and the outer half (more preferably at or near the outermost circumference) of disc 34 (relative to the other disc, as determined when the discs are in a stationary state) such that the elastic device 36 extends between disc 32 and disc 34. In order to facilitate the desired rotation of disc 34 in this exemplary embodiment, an additional disc 38 is positioned between disc 34 and component 40. In particular, disc 38 is engaged or otherwise associated with disc 34 and component 40 such that disc 38 is adapted to rotate in the direction of translation of component 40. Disc 32 is also engaged or otherwise associated with component 40. However, due at least in part to elastic device 36 and disc 38, translation of component 40 induces rotation of disc 32 and disc 34 such that disc 32 and disc 34 (via disc 38) create forces that are transferred to component 40 to induce positive stiffness and negative stiffness, respectively. Specifically, in this exemplary embodiment, disc 32 and disc 34 are adapted to rotate in opposite directions due to disc 38, and the torques that are adapted to develop about disc 32 and disc 34 are in the same direction due at least in part to elastic device 36 and disc 38. The torque about disc 34, however, is transferred to disc 38 in the opposite direction. As a result, the torque from disc 32 resists the motion of the translating component, while the torque from disc 34 assists the motion of the translating component, via disc 38.

With reference to FIG. 2, if inertia and friction are neglected, it can be shown that the total force exerted on the translating component in the direction of displacement u is:

$$F_{VNSD} = -F_{N_1} + F_{NP_1} - F_{NP_2}, \quad (1)$$

where $F_{N_1}$, $F_{NP_1}$, $F_{NP_2}$ are the forces exerted on the translating component 40 from disc 22 of the N-N pair, disc 32 of the N-P disc pair, and disc 34 of the N-P disc pair, respectively. The forces in Eq. (1) are due to the torques $T_{N_1}$, $T_{N_2}$, $T_{NP_1}$, and $T_{NP_2}$ that develop about the discs during rotation, and can be expressed as follows:

$$F_{N_1} = \frac{T_{N_1}}{r_{N_1}} + \frac{T_{N_2}}{r_{N_2}}, \quad F_{NP_1} = \frac{T_{NP_1}}{r_{NP_1}}, \text{ and } F_{NP_2} = \frac{T_{NP_2}}{r_{NP_2}}, \quad (2)$$

where $r_{N_1}$, $r_{N_2}$, $r_{NP_1}$, and $r_{NP_2}$ are the radii of the corresponding discs. The torques in Eq. (2) are due to the product of the spring forces and torque arms, given by:

$$T_{N_1} = F_{N_S} * r_{N_1} *; T_{N_2} = F_{N_S} * r_{N_2} *; T_{NP_1} = F_{NP_S} * r_{NP_1} *; \\ T_{NP_2} = F_{NP_S} * r_{NP_2} *. \quad (3)$$

The forces in the springs, $F_{N_S}$ and $F_{NP_S}$, depend on the spring stiffness and change in spring lengths during rotation of the discs, and can be expressed as:

$$F_{N_S} = k_{N_S} * (L_{N_{US}} - L_{N_S}) \text{ and } F_{NP_S} = k_{NP_S} * (L_{NP_{US}} - L_{NP_S}), \quad (4)$$

where $L_{N_{US}}$ and $L_{NP_{US}}$ are the unstretched lengths, and $L_{N_S}$ and $L_{NP_S}$ are the stretched lengths, of the springs on either the N-N or N-P disc pair, respectively. The initial unstretched lengths of the springs are selected such that the springs are pretensioned. The stretched lengths of the springs in Eq. (4), and the perpendicular distances in Eq. (3), are functions of the rotation angles of the discs. The stretched length and perpendicular distances for the N-N disc pair can be expressed by:

$$L_{N_S} = \sqrt{(r_{N_1}+d_1)^2 + (r_{N_2}+d_2)^2 - 2(r_{N_1}+d_1)\cdot(r_{N_2}+d_2)\cdot\cos(\beta_N)}, \quad (5)$$

and $$r_{N_1}^\perp = r_{N_1}\cdot\sin(\beta_N)\cdot\frac{(r_{N_2}+d_2)}{L_{N_S}} \text{ and} \quad (6)$$

$$r_{N_2}^\perp = r_{N_2}\cdot\sin(\beta_N)\cdot\frac{(r_{N_1}+d_1)}{L_{N_S}},$$

where, $$d_1 = \frac{\sin(\theta_{N_2})}{\sin(\beta_N)}\cdot(r_{N_1}+r_{N_2}), \quad d_2 = \frac{\sin(\theta_{N_1})}{\sin(\beta_N)}\cdot(r_{N_1}+r_{N_2}), \text{ and} \quad (7)$$

$$\beta_N = \pi - (\theta_{N_1} + \theta_{N_2}).$$

In Eq. (7), the disc rotation angles are a function of the translation u, and are given by:

$$\theta_{N_1} = \frac{u}{r_{N_1}} \text{ and } \theta_{N_2} = \frac{u}{r_{N_2}}. \quad (8)$$

Meanwhile, the stretched length and perpendicular distances for the N-P disc pair are given by:

$$L_{NP_S} = \sqrt{\begin{array}{l}[r_{NP_2}\cdot\sin(\theta_{NP_2}) + r_{NP_1}\cdot\sin(\theta_{NP_1})]^2 + \\ [d + r_{NP_2}\cdot\cos(\theta_{NP_2}) - r_{NP_1}\cdot\cos(\theta_{NP_1})]^2\end{array}}, \quad (9)$$

and $$r_{NP_1}^\perp = r_{NP_1}\cdot\sin(\theta_{NP_1} + \beta_{NP}) \text{ and} \quad (10)$$

$$r_{NP_2}^\perp = r_{NP_2}\cdot\sin(\theta_{NP_2} - \beta_{NP}),$$

where, $$\beta_{NP} = \tan^{-1}\left[\frac{r_{NP_2}\cdot\sin(\theta_{NP_2}) + r_{NP_1}\cdot\sin(\theta_{NP_1})}{d + r_{NP_2}\cdot\cos(\theta_{NP_2}) - r_{NP_1}\cdot\cos(\theta_{NP_1})}\right], \quad (11)$$

and d is the center-to-center distance between the discs, and must be greater than the sum of the disc radii ($d > r_{NP_1} + r_{NP_2}$). Once again, the disc rotation angles in Eqs. (9)-(11) are a function of the translation u, and are given by:

$$\theta_{NP_1} = \frac{u}{r_{NP_1}} \text{ and } \theta_{NP_2} = \frac{u}{r_{NP_2}}. \quad (12)$$

Equations (1)-(12) may be used to describe the force $F_{VNSD}$ as a function of the displacement u. The exemplary embodiment of Configuration 1 shown in FIG. 2 may be used to obtain both force-displacement profiles shown in FIG. 1. In particular, Configuration 1 may be used to produce profiles that transition from zero stiffness, to negative stiffness, and then to positive stiffness (ZNP) (see FIG. 1(a)), as well as from zero stiffness, to negative stiffness, and then back to zero stiffness (ZNZ) (see FIG. 1(b)). These profiles, referred to hereafter as ZNP1 and ZNZ1, will have the same actual-to-apparent yield displacement ratios.

Figure 3:
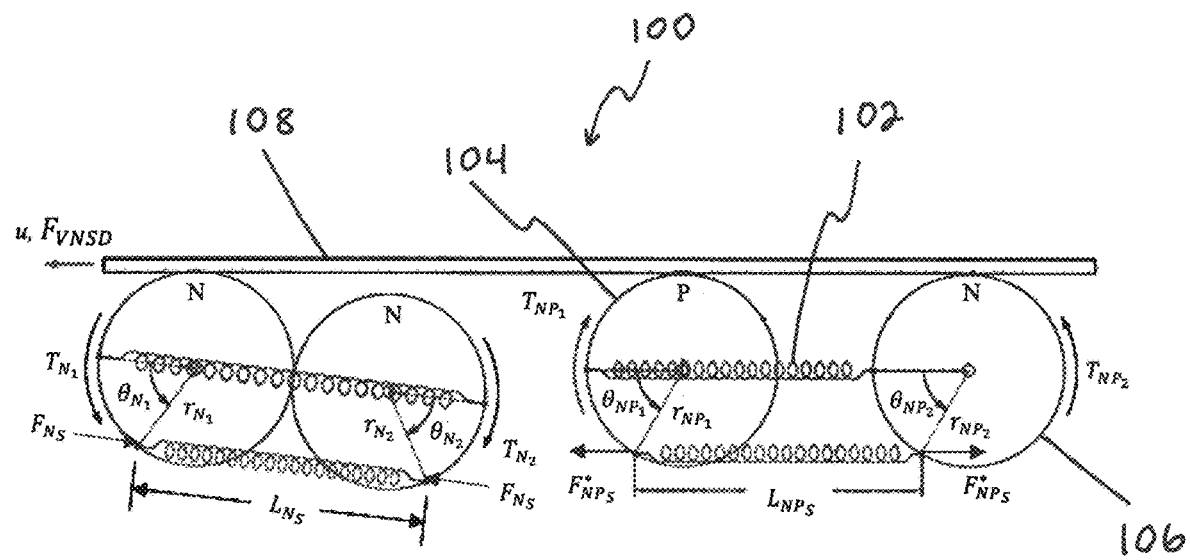
FIG. 3 is a schematic of a second exemplary embodiment of a passive VNSD.

A second exemplary embodiment of a VNSD (i.e., Configuration 2 or system 100) is shown in FIG. 3. In Configuration 2, the N-N disc pair is the same as in Configuration 1, but the additional disc between the N-disc and the translating component of the N-P disc pair is omitted, and a precompressed elastic device (e.g., spring) is connected to the left side of the discs in the N-P disc pair (as shown in FIG. 3). More particularly, a precompressed elastic device 102 is connected on the outer half (more preferably at or near the outermost circumference) of disc 104 and the inner half (more preferably at or near the innermost circumference) of disc 106 (relative to the other disc, as determined when the discs are in a stationary state) such that the elastic device 102 extends between disc 104 and disc 106. In this instance, due at least in part to precompressed spring 102, the respective torques that are adapted to develop about the discs are in opposite directions relative to each other. In particular, disc 104 is adapted to produce torque that opposes the translation of component 108 to induce positive stiffness, whereas disc 106 is adapted to produce torque that facilitates the translation of component 108 to induce negative stiffness.

The force-displacement relationship for Configuration 2 can be obtained by modifying Eqs. (4) and (9)-(11) of the N-P disc pair in Configuration 1 as shown below (wherein superscript indicates a modification):

$$F_{NP_S}^* = k_{NP_S} * (L_{NP_S}^* - L_{NP_{US}}), \quad (13)$$

$$L_{NP_S}^* = \sqrt{\begin{array}{l}[r_{NP_2}\cdot\sin(\theta_{NP_2}) - r_{NP_1}*\sin(\theta_{NP_1})]^2 + \\ [d + r_{NP_1}\cdot\cos(\theta_{NP_1}) - r_{NP_2}\cdot\cos(\theta_{NP_2})]^2\end{array}}, \quad (14)$$

$$r_{NP_2}^{\perp*} = r_{NP_2}\cdot\sin(\theta_{NP_2} + \beta_{NP}), \quad (15)$$

and $$\beta_{NP}^* = \tan^{-1}\left[\frac{r_{NP_2}\cdot\sin(\theta_{NP_2}) - r_{NP_1}\cdot\sin(\theta_{NP_1})}{d + r_{NP_1}\cdot\cos(\theta_{NP_1}) - r_{NP_2}\cdot\cos(\theta_{NP_2})}\right]. \quad (16)$$

Configuration 2 can be used to obtain a force-displacement profile that transitions from zero stiffness, to negative stiffness, and then back to zero stiffness. However, the actual-to-apparent yield ratio resulting from Configuration 2 will be smaller than that achieved from ZNZ1. Configuration 2 will be hereafter referred to as ZNZ2.

Figure 4:
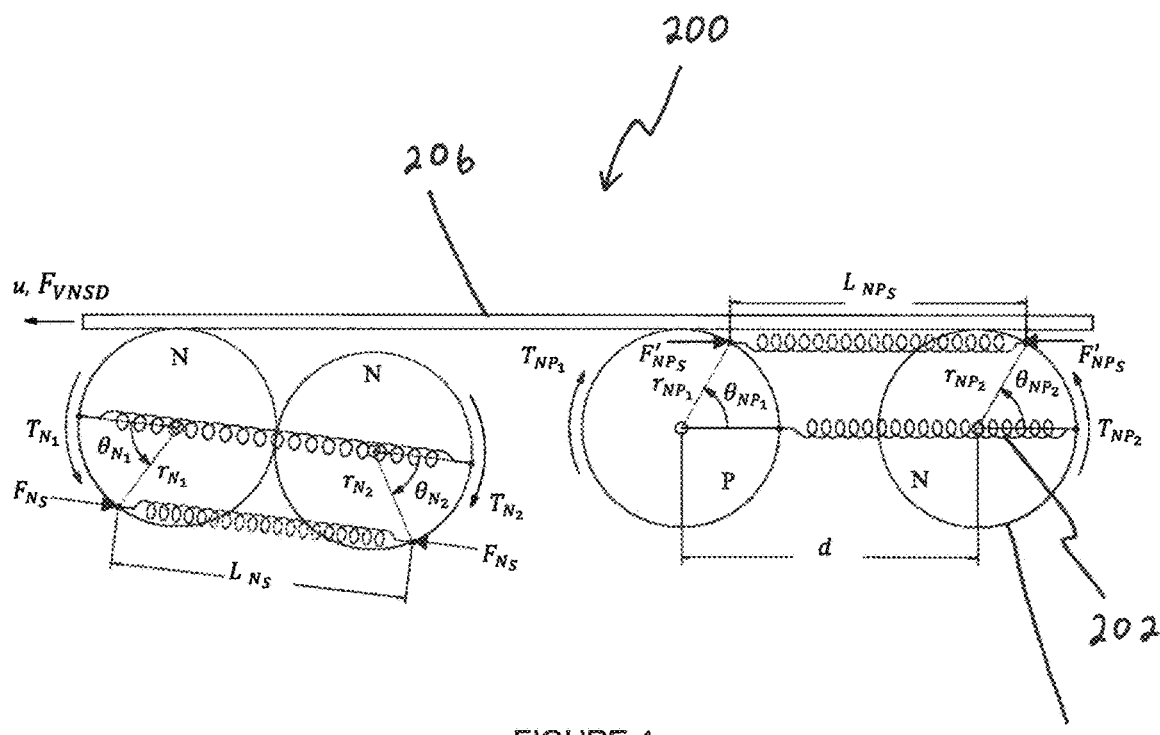
FIG. 4 is a schematic of a third exemplary embodiment of a passive VNSD.

A third exemplary embodiment of a VNSD (i.e., Configuration 3 or system 200) is shown in FIG. 4. In Configuration 3, the N-N disc pair is the same as in Configuration 1, but the additional disc between the N-disc and the translating component of the N-P disc pair is omitted. Similar to the N-P disc pair in Configuration 1, a pretensioned spring 202 is connected to the right side of the discs in the N-P disc pair in Configuration 3. As a result, the torque that is adapted to develop about disc 204 directly assists the translation of component 206.

For this exemplary embodiment, the force-displacement relationship can be obtained by modifying Eqs. (9)-(11) of the N-P disc pair of Configuration 1 as shown below (superscript indicates a modification):

$$L_{NP_S}' = \sqrt{\begin{array}{l}[r_{NP_2}\cdot\sin(\theta_{NP_2}) - r_{NP_1}\cdot\sin(\theta_{NP_1})]^2 + \\ [d + r_{NP_2}\cdot\cos(\theta_{NP_2}) - r_{NP_1}\cdot\cos(\theta_{NP_1})]^2\end{array}}, \quad (17)$$

$$r_{NP_1}^{\perp\prime} = r_{NP_2}\cdot\sin(\theta_{NP_2} - \beta_{NP}), \quad (18)$$

and

-continued $$\beta'_{NP} = \tan^{-1}\left[\frac{r_{NP_2} \cdot \sin(\theta_{NP_2}) - r_{NP_1} \cdot \sin(\theta_{NP_1})}{d + r_{NP_1} \cdot \cos(\theta_{NP_1}) - r_{NP_2} \cdot \cos(\theta_{NP_2})}\right]. \qquad (19)$$

Configuration 3 can produce a force-displacement profile that transitions from zero stiffness, to negative stiffness, and then back to zero stiffness. However, the profile is different than that achieved from ZNZ1 after the transition from negative stiffness to zero stiffness occurs. Configuration 3 will be hereafter referred to as ZNZ3.

Force-Displacement Profiles

Figure 5:
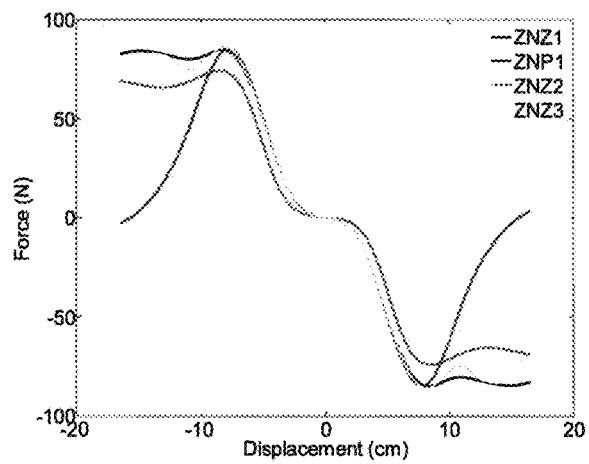
FIG. 5 is a graph showing exemplary force-displacement profiles (i.e., ZNZ1, ZNP1, ZNZ2, and ZNZ3) for the VNSD configurations shown in FIGS. 2-4.

In order to identify the parameters of Configurations 1, 2, and 3 leading to the desired force-displacement profiles, the disc sizes, ratios of disc sizes, spring stiffnesses, and spring preloads were varied during simulations. The resulting force-displacement profiles for each configuration are shown in FIG. 5. From FIG. 5, it can be observed that the profiles for all three configurations have zero stiffness starting at zero displacement, then change to negative stiffness, and finally transition to either zero or positive stiffness. Configuration 1, shown in FIG. 2, produced the force-displacement profiles ZNZ1 and ZNP1 shown in FIG. 5. Configuration 2, shown in FIG. 3, produced the force-displacement profile ZNZ2 shown in FIG. 5. Configuration 3, shown in FIG. 4, produced the force-displacement profile ZNZ3 shown in FIG. 5. In view of the disclosure herein, one of ordinary skill in the art should recognize that different results may be obtained by varying parameters such as the disc sizes, ratios of disc sizes, spring stiffnesses, spring preloads, and/or other parameters such as the particular location of attachment of an elastic device to a disc.

Numerical Validation

Figure 6A:
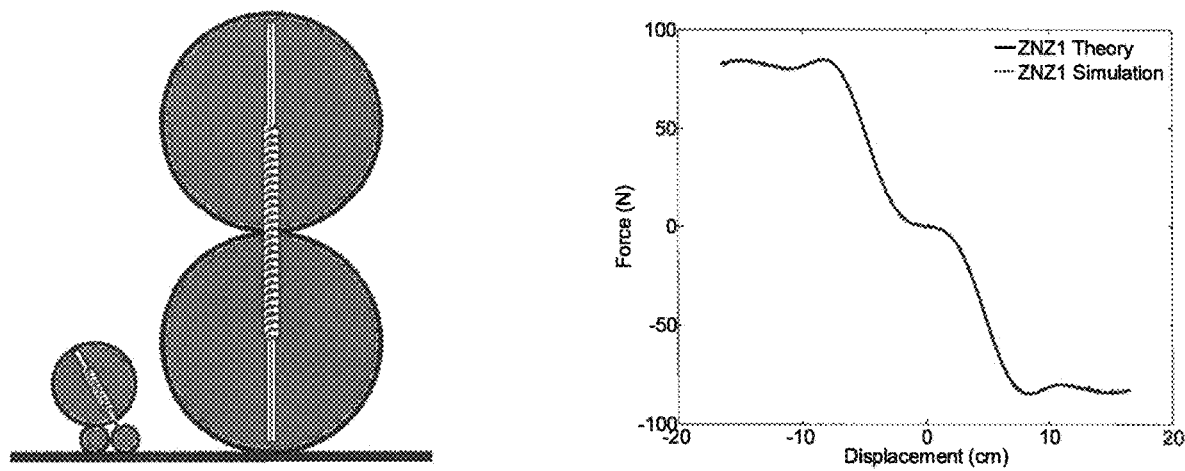
FIGS. 6(a)-(c) show models and theoretical versus simulated force-displacement profiles for (a) Configuration 1 (ZNZ1), (b) Configuration 2 (ZNZ2), and (c) Configuration 3 (ZNZ3).
Figure 6B:
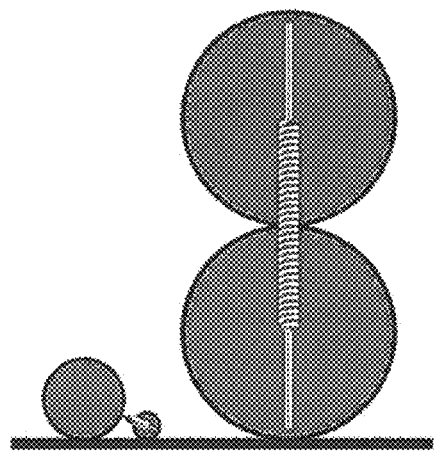
Figure 6B:
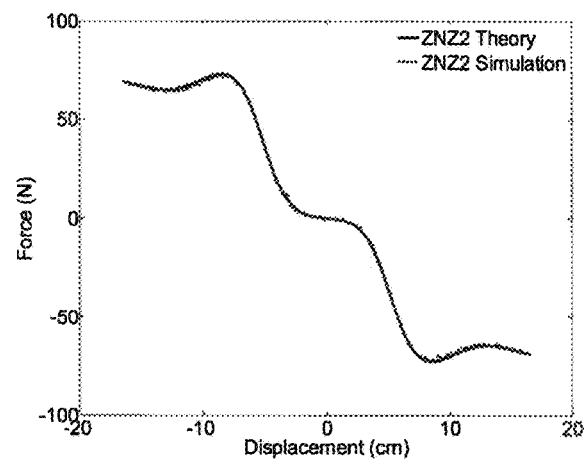
Figure 6C:
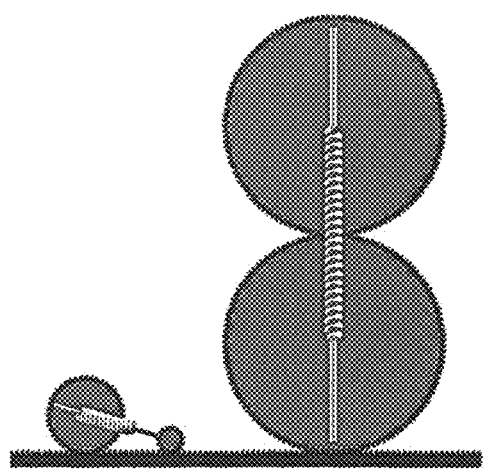
Figure 6C:
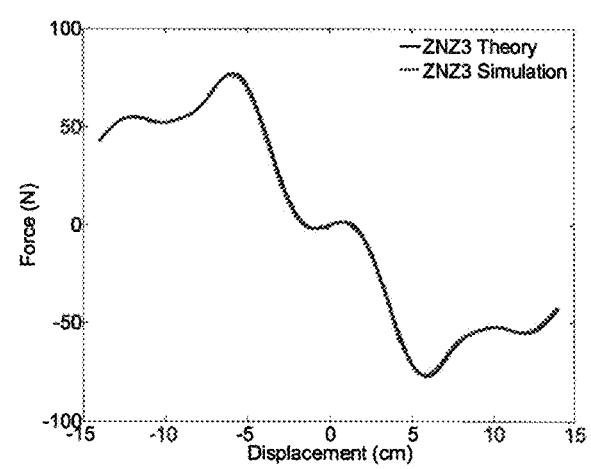

Configurations 1-3 were modeled in SolidWorks, and their force-displacement properties were validated through numerical simulations. For Configuration 1, only ZNZ1 was simulated, as ZNP1 is based on the same configuration with different parameters, and therefore did not require separate validation. The exemplary models used rack-and-pinion for converting between translation and rotation, and torque and force. The SolidWorks models, and the results of the validation, are shown in FIG. 6. Good agreement was observed between the theoretical force-displacement profiles and those simulated in SolidWorks. The profile for Configuration 3 (ZNZ3) shown in FIG. 6(c) is slightly different than that shown in FIG. 5 due to the use of different parameters. However, the same equations were used to obtain both profiles, and the comparison in FIG. 6(c) shows that the theory agrees well with the results of the Solidworks simulations.

Scalability

Figure 7A:
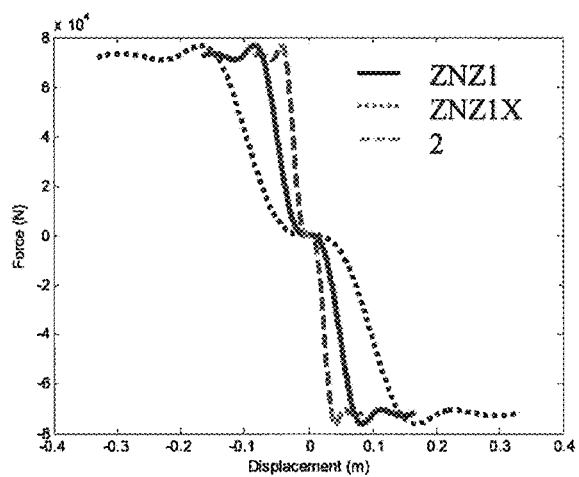
FIGS. 7(a) and (b) show graphs of exemplary VNSD force-displacement profiles scaled to different (a) displacement amplitude and (b) force amplitude.
Figure 7B:
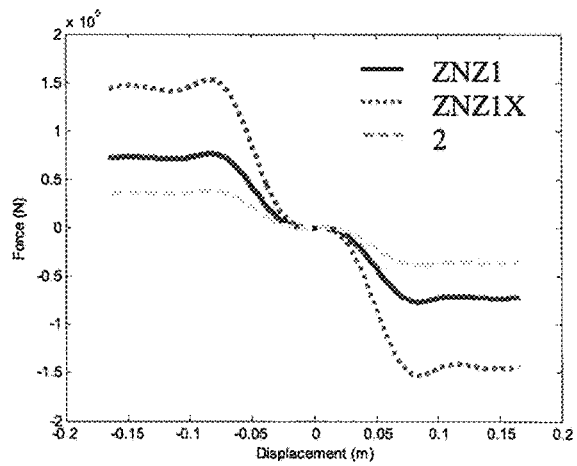

The force-displacement profiles of a VNSD may be scaled to the amplitude of, for example, the translating component displacements. With respect to such a system, this is achievable because the profiles depend on the relationships of the rotation angles within and between disc pairs, which in turn depend on the disc sizes and the translating component displacement. Scaling the system for larger or smaller translating component displacement amplitudes requires scaling the disc sizes in proportion, while maintaining the disc ratios within and between disc pairs. FIG. 7(a) represents exemplary force-displacement profiles for ZNZ1 of Configuration 1 scaled to three different translation component displacement amplitudes. As the displacement amplitude increases or decreases, the dimensions of the discs are scaled in proportion, and the force-displacement profiles maintain the same features. In addition to being scalable for different displacement amplitudes, the force-displacement profiles of the VNSD may also be scaled to different force magnitudes for a given displacement amplitude. This can be done by scaling the spring stiffnesses of the elastic devices on the N-N and N-P disc pairs, while maintaining the stiffness ratios within and between disc pairs. FIG. 7(b) represents force-displacement profiles for ZNZ1 of Configuration 1 scaled to three different force magnitudes for the same translating component displacement amplitude.

Force Amplification

Figure 8A:
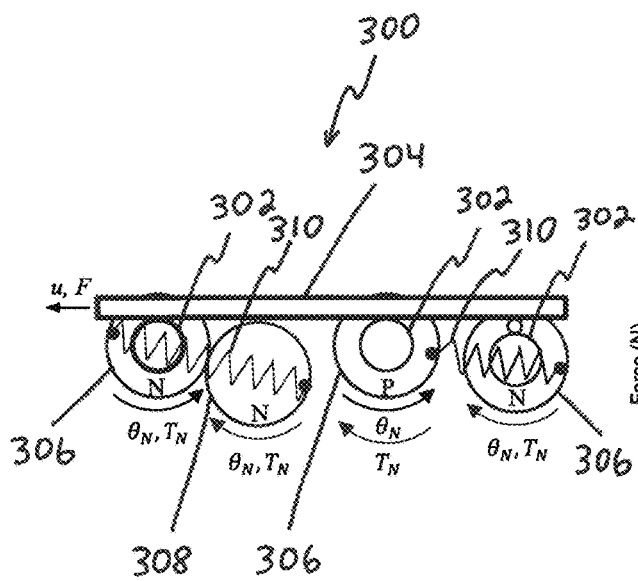
FIG. 8(a) shows a diagram for an exemplary embodiment of a passive VNSD using amplification.

In an exemplary embodiment, the magnitude of the VNSD force depends at least in part on the stiffnesses of the springs, which in turn is related to the spring sizes. For applications requiring large VNSD forces, amplification may be used to achieve the required forces while minimizing the spring sizes. For the example of a VNSD 300 using a rack-and-pinion configuration, each disc 302 connected to the translating component 304 may be fixed to a larger disc 306 such that the original discs 302 and the larger discs 306 rotate about the same axis (see FIG. 8(a)). Furthermore, as shown, the disc 308 in the N-N disc pair that is not connected directly to the translating component 304 is also increased in size proportionately to the disc 306. The original discs 302 are still connected to the translating component, but the springs 310 are now connected to the larger discs for amplification (similar to the connections of Configuration 1). As a result, the torques that develop about the larger discs 306 will be higher in magnitude due to their larger radius relative to the torques about the original discs 302, where the increase in torque is proportionate to the ratio of the radii of the larger-to-original disc. Also, since the force-displacement profile of the exemplary system depends on the rotation of the discs with respect to the movement of the translating component, and this rotation is the same for the original and larger discs, the shape of the force-displacement profile is unaffected by the amplification. The VNSD using amplification, hereafter referred to as VNSD-A, may achieve the same force displacement profile as the VNSD system without amplification while using a spring stiffness that is equal to the spring stiffness of the VNSD without amplification divided by the amplification factor squared.

Figure 8B:
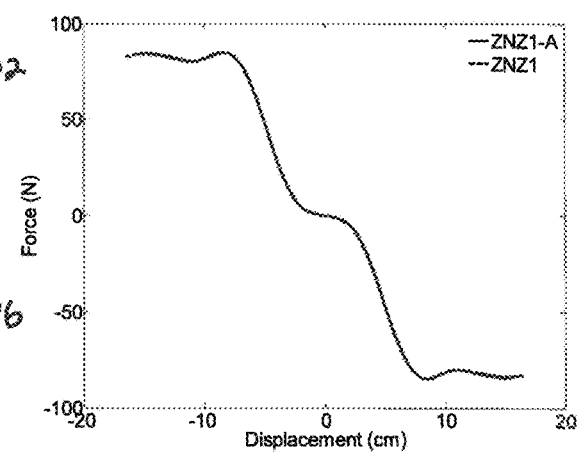
FIG. 8(b) shows an example of a simulated force-displacement profile for the embodiment of FIG. 8(a).

In order to demonstrate an example of amplification in the VNSD-A, a model of Configuration 1 with amplification was created in SolidWorks, and the force-displacement profile was obtained through simulation. The model was created so that the larger discs had radii that were two times those of the original discs, resulting in an amplification factor of two, and the springs connected to the larger discs had spring stiffnesses that were reduced by a factor of four relative to the un-amplified VNSD. The force-displacement profile for this exemplary embodiment of a VNSD-A is shown in FIG. 8(b). To demonstrate that the same force-displacement profile may be obtained from both the amplified and un-amplified version of Configuration 1, the force-displacement profile from the un-amplified model is included in the figure. As can be seen, both the amplified and un-amplified versions of the exemplary VNSD result in the same force-displacement profile while using different size springs.

Linear-to-Rotation and Torque-to-Force Conversion

Figure 9A:
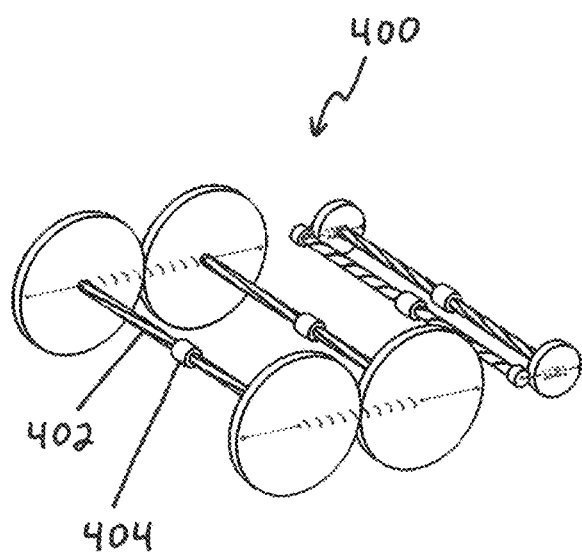
FIG. 9(a) shows a model for an exemplary embodiment of a passive VNSD using a back-driven ball screw.
Figure 9B:
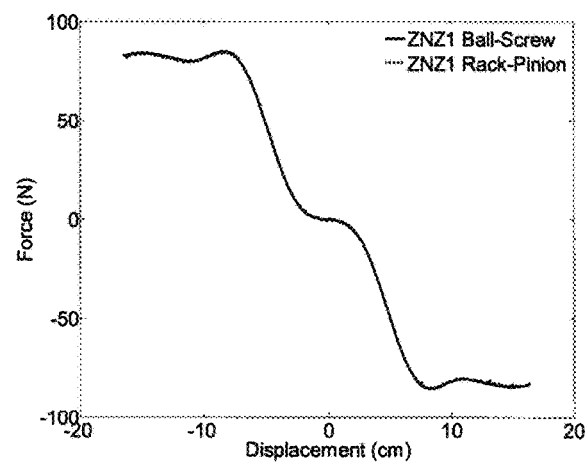
FIG. 9(b) shows an example of a simulated force-displacement profile for the model of FIG. 9(a).

In FIGS. 2-4, the exemplary embodiments of the VNSD configurations are shown as rack-and-pinion mechanisms. The rack-and-pinions may be used for converting the translating of a vibrating body to rotation of the discs, and converting the corresponding torques that develop in the discs to forces on the vibrating body. However, a rack-andpinion mechanism is not the only method that can be used for converting between translation and rotation, and torque and force. Another example of a conversion method that may be used is a ball-screw. An exemplary embodiment of a ball screw uses a threaded shaft with a helical groove through which ball bearings move. The shaft supports the ball assembly, which has internal threads matching the external threads of the shaft, and contains the ball bearings. As the shaft rotates, the ball bearings are forced along the helical groove, and cause the ball assembly to translate. While typically used for converting from rotation of the shaft to translation of the ball assembly, the ball-screw may also be back-driven, where translation of the ball assembly causes rotation of the shaft. Examples of back-driven ball-screws for small- and large-scale vibration applications can be found in the literature. In order to demonstrate an example of a back-driven ball-screw for a VNSD, a model of Configuration 1 comprising at least one ball-screw was created in SolidWorks, and the force-displacement profile was obtained through simulation. FIG. 9(a) shows the model of the exemplary embodiment, and FIG. 9(b) shows the resulting profile. For example, one of the ball screws 400 has a threaded shaft 402 and a ball assembly 404. Generally, in an exemplary configuration, all of the ball assemblies should undergo the same translation, which may, for example, be achieved by connecting the ball assemblies through a rigid component. To demonstrate that the VNSD concept is independent of the conversion mechanism, the force-displacement profile from the rack-and-pinion model has also been included in the figure. In particular, FIG. 9(b) shows that both mechanisms result in the same force-displacement profile.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system comprising:
   a translation component;
   a first pair of discs in association with said translation component, said first pair of discs comprised of a first disc that is associated with a second disc, said first pair of discs further comprising a first elastic device that extends between said first disc and said second disc; and
   a second pair of discs in association with said translation component, said second pair of discs comprised of a third disc that is associated with a fourth disc, said second pair of discs further comprising a second elastic device that extends between said third disc and said fourth disc;
   wherein said first pair of discs is adapted to create forces in response to translation of said translation component such that said forces are transferred to said translation component to induce a negative stiffness; and
   wherein said second pair of discs is adapted to create forces in response to translation of said translation component such that said forces are transferred to said translation component to induce a combination of negative stiffness and positive stiffness.

2. The system of claim 1 wherein said system is adapted to produce force-displacement profiles that transition from zero stiffness, to negative stiffness, and then to positive stiffness (ZNP) and from zero stiffness, to negative stiffness, and then back to zero stiffness (ZNZ).

3. The system of claim 1 wherein said first elastic device is connected on an outer half of each said first disc relative to the other said second disc of said first pair of discs.

4. The system of claim 1 wherein said first elastic device is connected at or near an outermost circumference of each said first disc relative to the other said second disc of said first pair of discs.

5. The system of claim 1 wherein said first elastic device is pretensioned.

6. The system of claim 1 wherein:
   said first disc is engaged with said translation component; and
   said second disc is separated from said translation component;
   wherein translation of said translation component is adapted to induce rotation of said first disc, which in turn causes counter-rotation of said second disc.

7. The system of claim 1 wherein said second elastic device is connected on an inner half of said third disc relative to said fourth disc and on an outer half of said fourth disc relative to said third disc.

8. The system of claim 7 wherein translation of said translation component is adapted to induce respective torques to develop about said third disc and said fourth disc that are in opposite directions relative to each other.

9. The system of claim 1 wherein said second elastic device is connected at or near an innermost circumference of said third disc relative to said fourth disc and at or near an outermost circumference of said fourth disc relative to said third disc.

10. The system of claim 9 wherein translation of said translation component is adapted to induce respective torques to develop about said third disc and said fourth disc that are in opposite directions relative to each other.

11. The system of claim 1 wherein said second elastic device is pretensioned.

12. The system of claim 11 wherein translation of said translation component is adapted to induce respective torques to develop about said third disc and said fourth disc that are in opposite directions relative to each other.

13. The system of claim 1 further comprising an additional disc positioned between said fourth disc and said translation component such that said additional disc is engaged with said fourth disc and said translation component;
   wherein said additional disc is adapted to rotate in a direction of translation of said translation component.

14. The system of claim 1 wherein translation of said translation component is adapted to induce respective torques to develop about said third disc and said fourth disc that are in a same direction.

15. The system of claim 1 wherein said second elastic device is connected on an outer half of said third disc relative to said fourth disc and on an inner half of said fourth disc relative to said third disc.

16. The system of claim 15 wherein said second elastic device is connected at or near an outermost circumference of said third disc relative to said fourth disc and at or near an innermost circumference of said fourth disc relative to said third disc.

17. The system of claim 15 wherein said second elastic device is precompressed.

18. The system of claim 1 wherein translation of said translation component is adapted to induce respective torques to develop about said third disc and said fourth disc that are in opposite directions relative to each other.

19. The system of claim 1 wherein said system is a rack-and-pinion mechanism.

20. The system of claim 1 further comprising at least one ball-screw to convert translation of said translation component to rotation of at least one of said first, second, third and fourth discs.

* * * * *